US006376857B1

(12) United States Patent
Imai

(10) Patent No.: US 6,376,857 B1
(45) Date of Patent: Apr. 23, 2002

(54) READ-OUT APPARATUS FOR AN IMAGE DETECTOR

(75) Inventor: Shinji Imai, Kanagawa-ken (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/404,371

(22) Filed: Sep. 24, 1999

(30) Foreign Application Priority Data

Sep. 25, 1998 (JP) ............................. 10-271374
Aug. 30, 1999 (JP) ............................. 11-242876

(51) Int. Cl.⁷ ................................................ G01T 1/16
(52) U.S. Cl. ...................................... 250/591; 250/580
(58) Field of Search .......................... 250/591, 580, 250/484.2; 378/29, 98.8

(56) References Cited

U.S. PATENT DOCUMENTS

| | | | | |
|---|---|---|---|---|
| 4,176,275 A | | 11/1979 | Korn et al. ............. 250/213 R |
| 4,521,808 A | * | 6/1985 | Ong et al. ................. 358/111 |
| 5,440,146 A | | 8/1995 | Steffen et al. ............. 250/580 |
| 5,510,626 A | | 4/1996 | Nelson et al. ............. 250/591 |
| 5,994,713 A | * | 11/1999 | Becker et al. ............. 250/591 |
| 6,078,643 A | * | 6/2000 | Vogelsong et al. ......... 378/98.2 |
| 6,268,614 B1 | * | 7/2001 | Imai ........................... 250/591 |

FOREIGN PATENT DOCUMENTS

EP    0 898 421 A2    2/1999 ............ H04N/5/30

OTHER PUBLICATIONS

Donald M. Korn et al, A Method of Electronic Readout of Electrophotographic and Electroradiographic Images, Journal of Applied Photographic Engineering, vol. 4, No. 4, Fall 1978, pp. 178–182.
Method and device for recording and transducing an electromagnetic energy pattern, Research Disclosure, Jun. 1983.

* cited by examiner

Primary Examiner—Constantine Hannaher
Assistant Examiner—Otilia Gabor
(74) Attorney, Agent, or Firm—Sughrue Mion, PLLC

(57) ABSTRACT

A read-out apparatus for an image detector scans the image detector, on which image information has been recorded as an electrostatic latent image, with a reading electromagnetic wave and detects electric currents caused by the scanning to flow out of the image detector in accordance with the electrostatic latent image. The read-out apparatus comprises a surface-shaped wave source constituted of a plurality of small wave sources, which are arrayed in a surface form and each of which produces the reading electromagnetic wave, and a wave source controller for performing the scanning by driving the small wave sources one after another. The read-out apparatus reads out the electrostatic latent image without mechanical scanning being required.

14 Claims, 4 Drawing Sheets

X-Z CROSS SECTION

X-Y CROSS SECTION

X-Z CROSS SECTION

X-Y CROSS SECTION

READ-OUT APPARATUS FOR AN IMAGE DETECTOR

BACKGROUND OF THE INVENTION

1. Field of the Invention

This invention relates to a read-out apparatus for an image detector. This invention particularly relates to a read-out apparatus for reading out an electrostatic latent image from an image detector, which generates a current in accordance with latent image charges carrying image information. This invention also relates to an image detecting and read-out apparatus comprising the read-out apparatus and the image detector, which are combined with each other.

2. Description of the Prior Art

Apparatuses utilizing image detectors, e.g. facsimile apparatuses, copying machines, and radiation image sensors, have heretofore been known.

For example, systems for recording and reading out radiation image information utilizing image detectors have heretofore been proposed. With the proposed systems for recording and reading out radiation image information, such that a radiation dose delivered to an object during a medical X-ray image recording operation may be kept small, and such that the image quality of an image and its capability of serving as an effective tool in, particularly, the efficient and accurate diagnosis of an illness may be enhanced, a photo-conductive material sensitive to X-rays, such as a selenium plate constituted of, e.g., a-Se, is employed as a photosensitive material or an electrostatic recording material. The photosensitive material (or the electrostatic recording material) is exposed to radiation, such as X-rays, carrying radiation image information, and latent image charges carrying the radiation image information are thereby accumulated in the photosensitive material. Thereafter, the photosensitive material is scanned with a laser beam, and currents occurring in the photosensitive material are detected via flat plate-shaped electrodes or comb tooth-shaped electrodes, which are located on opposite surface sides of the photosensitive material. In this manner, the electrostatic latent image represented by the latent image charges, i.e. the radiation image information, is read out. Such systems for recording and reading out radiation image information are described in, for example, U.S. Pat. Nos. 4,176,275, 5,440, 146, and 5,510,626, "A Method of Electronic Readout of Electrophotographic and Electroradiographic Image," Journal of Applied Photographic Engineering, Volume 4, Number 4, Fall 1978, pp. 178–182 (hereinbelow referred to as the Literature 1), and "23027 Method and device for recording and transducing an electromagnetic energy pattern," Research Disclosure, Jun. 1983 (hereinbelow referred to as the Literature 2).

With the systems described in U.S. Pat. Nos. 4,176,275 and 5,510,626 and the Literature 1, a laser beam having been produced by an argon laser is expanded into a thin line-shaped light (a line light), and the line light is focalized by a cylindrical lens onto a photosensitive material, on which an electrostatic latent image has been recorded. In this manner, the photosensitive material is mechanically scanned with the line light, and the electrostatic latent image having been recorded on the photosensitive material is read out in a parallel manner with a plurality of comb tooth-shaped electrodes.

In the systems described in U.S. Pat. Nos. 4,176,275 and 5,510,626 and the Literature 1, such that the photosensitive material, from which the electrostatic latent image has been read out, may be used again for the recording of an elec-trostatic latent image, it is necessary to perform an erasing process for exposing the photosensitive material to uniform erasing light. In U.S. Pat. No. 5,510,626, a system provided with means for cutting out light having wavelengths for readout (wavelengths of blue light) as a light source for producing the uniform erasing light is disclosed.

With the system described in the Literature 2, pre-charging is performed with primary exposure, and thereafter final recording is performed.

Also, in Japanese Patent Application No. 10(1998)-232824, the applicant proposed an electrostatic recording material and a read-out apparatus for reading out radiation image information from the electrostatic recording material, on which the radiation image information has been recorded. The proposed electrostatic recording material comprises:

i) a first electrical conductor layer having permeability to recording radiation, ii) a recording photo-conductive layer, which exhibits photo-conductivity when it is exposed to the recording radiation, iii) a charge transporting layer, which acts approximately as an insulator with respect to electric charges having a polarity identical with the polarity of electric charges occurring in the first electrical conductor layer, and which acts approximately as a conductor with respect to electric charges having a polarity opposite to the polarity of the electric charges occurring in the first electrical conductor layer, iv) a reading photo-conductive layer, which exhibits photo-conductivity when it is exposed to a reading electromagnetic wave, and v) a second electrical conductor layer having permeability to the reading electromagnetic wave, the layers being overlaid in this order.

With the read-out apparatus described in Japanese Patent Application No. 10(1998)-232824, the electrostatic recording material, on which an electrostatic latent image has been recorded, is scanned with a reading electromagnetic wave having been produced by a light source, and the electrostatic latent image having been recorded on the electrostatic recording material is thereby read out. Japanese Patent Application No. 10(1998)-232824 also discloses a technique for performing pre-exposure prior to the recording of the electrostatic latent image and thereby preventing image quality from becoming bad due to a residual image or a dark latent image.

However, with the systems described in U.S. Pat. Nos. 4,176,275 and 5,510,626 and the Literature 1, wherein the photosensitive material is mechanically scanned with the line light, it is necessary for the cylindrical lens for the scanning, a mechanical scanning section, and the like, to be provided. Therefore, the problems occur in that a large number of parts must be provided, and the read-out apparatus cannot be kept cheap in cost and small in size. Also, the problems occur in that scanning nonuniformity ordinarily occurs with the mechanical scanning.

Further, as described in U.S. Pat. No. 5,510,626, such that the photosensitive material, from which the electrostatic latent image has been read out, may be used again for the recording of an electrostatic latent image, the systems described in U.S. Pat. Nos. 4,176,275 and 5,510,626 and the Literature 1 must be provided with means for cutting out light having wavelengths for readout from the light having been produced by the erasing light source. Therefore, the number of necessary parts increases even further, and the problems occur in that the read-out apparatus becomes expensive and large in size.

With the system described in the Literature 2, besides the light source for readout, a light source for the primary exposure must be provided. Therefore, the problems occur in that the read-out apparatus cannot be kept cheap in cost and small in size.

In Japanese Patent Application No. 10(1998)232824, it is not described clearly whether the scanning with reading light is or is not the mechanical scanning. However, from drawings for embodiments, it is presumed that the scanning with the reading light is the mechanical scanning. In cases where the scanning is the mechanical scanning, the same problems as those encountered with the systems described in U.S. Pat. No. 4,176,275, and the like, occur.

In cases where the scanning with the reading light is the mechanical scanning, the photosensitive material or the electrostatic recording material, on which the electrostatic latent image has been recorded, must be set on the read-out apparatus, and the electrostatic latent image must be read out with the read-out apparatus. Therefore, it is difficult to combine the photosensitive material, or the like, and the read-out apparatus with each other, i.e. to form a portable type of apparatus, such that the electrostatic latent image can be read out immediately after the recording or whenever it is to be read out.

SUMMARY OF THE INVENTION

The primary object of the present invention is to provide a read-out apparatus for an image detector, wherein an electrostatic latent image is capable of being read out from a photosensitive material, or the like, without mechanical scanning being required.

Another object of the present invention is to provide an image detecting and read-out apparatus comprising a read-out apparatus and an image detector, which are combined with each other.

The present invention provides a read-out apparatus for an image detector, wherein a reading electromagnetic wave is caused to scan an image detector, on which image information has been recorded as an electrostatic latent image, and electric currents caused by the scanning to flow out of the image detector in accordance with the electrostatic latent image are detected, the read-out apparatus comprising:

i) a surface-shaped wave source constituted of a plurality of small wave sources, which are arrayed in a surface form and each of which produces the reading electromagnetic wave, and ii) wave source control means for performing the scanning by driving the small wave sources one after another.

The term "image detector" as used herein means the device capable of recording image information as an electrostatic latent image and generating electric currents in accordance with the electrostatic latent image when being scanned with the reading electromagnetic wave. By way of example, the image detector may be the photosensitive material described in U.S. Pat. No. 4,176,275, or the like, or the Literature 1, or the electrostatic recording material described in Japanese Patent Application No. 10(1998)-232824. As the image detector, an image detector may be employed, which is capable of recording image information as an electrostatic latent image when being exposed to light (not limited to visible light) carrying the image information. Alternatively, an image detector may be employed, which is capable of recording radiation image information as an electrostatic latent image when being exposed to radiation carrying the radiation image information of an object. This also applies to an image detector of an image detecting and read-out apparatus in accordance with the present invention, which will be described later.

The reading electromagnetic wave may be one of various kinds of electromagnetic waves, with which the electrostatic latent image is capable of being read out from the image detector. Specifically, the reading electromagnetic wave may be light, radiation, or the like. Therefore, in cases where light is utilized as the reading electromagnetic wave, the wave source may be referred to as the light source. In cases where radiation is utilized as the reading electromagnetic wave, the wave source may be referred to as the radiation source.

The read-out apparatus for an image detector in accordance with the present invention should preferably be modified such that it further comprises electromagnetic shield means located at least on the side of the surface-shaped wave source, which stands facing the image detector. The electromagnetic shield means should have permeability to the reading electromagnetic wave. Besides the side of the surface-shaped wave source, which stands facing the image detector, the electromagnetic shield means should preferably be located also on other sides of the surface-shaped wave source. For example, the electromagnetic shield means should preferably be located so as to surround the entire surface-shaped wave source. In cases where the electromagnetic shield means surrounds the entire surface-shaped wave source, it is only necessary that at least the side of the electromagnetic shield means, which stands facing the image detector, has permeability to the reading electromagnetic wave, and all sides of the electromagnetic shield means need not necessarily be permeable to the reading electromagnetic wave.

Also, the read-out apparatus for an image detector in accordance with the present invention should preferably be modified such that the wave source control means is capable of simultaneously driving the plurality of the small wave sources so as to irradiate a pre-exposure electromagnetic wave to the image detector. In such cases, the plurality of the small wave sources may be driven simultaneously, and the pre-exposure electromagnetic wave may thereby be irradiated to the image detector. It is most preferable that the pre-exposure electromagnetic wave is irradiated simultaneously to the entire area of the image detector. Alternatively, for example, the pre-exposure electromagnetic wave may be irradiated to the right half of the image detector and then to the left half of the image detector.

The term "pre-exposure" as used herein means that the electromagnetic wave is irradiated to the image detector in order to eliminate unnecessary electric charges accumulated in the image detector before the recording light is irradiated to the image detector (as described in Japanese Patent Application No. 10(1998)-232824), or that primary exposure is performed in order to perform pre-charging before final recording is performed (as described in the Literature 2). The wavelengths of the pre-exposure electromagnetic wave may be identical with the wavelengths of the reading electromagnetic wave, or may be different from the wavelengths of the reading electromagnetic wave.

Further, the read-out apparatus for an image detector in accordance with the present invention should preferably be modified such that the plurality of the small wave sources are point-shaped small wave sources, and the surface-shaped wave source is constituted of the plurality of the point-shaped small wave sources, which are arrayed in a matrix form. Alternatively, the plurality of the small wave sources may be line-shaped small wave sources, and the surface-shaped wave source is constituted of the plurality of the line-shaped small wave sources, which are arrayed so as to stand side by side along a direction normal to a longitudinal direction of each small wave source. In such cases, the point-shaped small wave sources or the line-shaped small wave sources may be arrayed such that they may be in close contact with one another or such that they may be disposed at a predetermined spacing from one another. For example, in order for the read-out sharpness to be enhanced, the small wave sources may be disposed at a predetermined spacing from one another.

In cases where the plurality of the line-shaped small wave sources are arrayed so as to stand side by side along the direction normal to the longitudinal direction of each small wave source, each of the line-shaped small wave sources should preferably be constituted of a plurality of point-shaped small wave sources, which are arrayed in a line form. In such cases, the plurality of the point-shaped small wave sources, which constitute each line-shaped small wave source, may be arrayed such that they may be in close contact with one another or such that they may be disposed at a predetermined spacing from one another.

In the read-out apparatus for an image detector in accordance with the present invention, the surface-shaped wave source should preferably be constituted of an electroluminescence (EL) device, such as an organic EL device. Alternatively, the surface-shaped wave source may be constituted of a liquid crystal and a back light source, which is located on a side of the liquid crystal that is opposite to the side of the liquid crystal facing the image detector. Particularly, in cases where the organic EL device is employed, the organic EL device should preferably be provided with a dielectric multi-layer film, which is located on the side facing the image detector.

The present invention also provides an image detecting and read-out apparatus, comprising:

i) an image detector, which records image information as an electrostatic latent image and which generates electric currents in accordance with the electrostatic latent image when it is scanned with a reading electromagnetic wave, ii) current detecting means for detecting the electric currents generated by the image detector, iii) a surface-shaped wave source constituted of a plurality of small wave sources, which are arrayed in a surface form and each of which produces the reading electromagnetic wave, and iv) wave source control means for performing the scanning by driving the small wave sources one after another, the image detector, the current detecting means, the surface-shaped wave source, and the wave source control means being combined with one another.

As the surface-shaped wave source constituting the image detecting and read-out apparatus in accordance with the present invention, one of various examples of the surface-shaped wave source constituting the aforesaid read-out apparatus for an image detector in accordance with the present invention may be employed. In such cases, the surface-shaped wave source should preferably take on the form adapted to the form of reading electrodes of the image detector (e.g., the flat plate-shaped electrode or the comb tooth-shaped electrodes). For example, in cases where the image detector has the comb tooth-shaped electrodes, the surface-shaped wave source should preferably be constituted of a plurality of line-shaped small wave sources, which are arrayed so as to stand side by side along the direction normal to the longitudinal direction of each small wave source.

Also, in the image detecting and read-out apparatus in accordance with the present invention, the electromagnetic shield means described above should preferably be utilized. Further, the wave source control means should preferably be capable of simultaneously driving the plurality of the small wave sources so as to irradiate a pre-exposure electromagnetic wave to the image detector.

Specifically, the image detecting and read-out apparatus in accordance with the present invention comprises the image detector and the read-out apparatus, which are combined with each other, and the aforesaid features of the read-but apparatus for an image detector in accordance with the present invention may also be employed in the image detecting and read-out apparatus in accordance with the present invention.

With the read-out apparatus for an image detector in accordance with the present invention, the plurality of the small wave sources are arrayed in a surface form and driven one after another. In this manner, the image detector is scanned with the reading electromagnetic wave. Therefore, it is unnecessary for mechanical scanning as in conventional techniques to be performed for the scanning with the reading electromagnetic wave. As a result, the number of parts can be kept small, and a simple, cheap, and small read-out apparatus can be formed. Also, since the mechanical scanning is not performed, the scanning system need not be provided with movable parts. Accordingly, the reliability of the read-out apparatus can be enhanced, and scanning non-uniformity can be reduced.

Further, with the read-out apparatus for an image detector in accordance with the present invention, wherein the electromagnetic shield means is located at least on the side of the surface-shaped wave source, which stands facing the image detector, the problems can be prevented from occurring in that noise appears on the read-out image due to electromagnetic noise occurring when the small wave sources are changed over and driven one after another.

Furthermore, with the read-out apparatus for an image detector in accordance with the present invention, wherein the irradiation of the pre-exposure electromagnetic wave to the image detector is performed by utilizing the reading wave source and by simultaneously driving the plurality of the small wave sources, the reading wave source can be utilized also as the pre-exposure wave source. Therefore, the number of parts of the apparatus can be kept small, and a cheap and small apparatus can be formed.

Also, in cases where the plurality of the small wave sources are arrayed in a surface form, for example, the plurality of the point-shaped may be arrayed in a matrix form, or the plurality of the line-shaped small wave sources may be arrayed so as to stand side by side along the direction normal to the longitudinal direction of each small wave source. Therefore, the constitution of the small wave sources can be selected appropriately in accordance with the form of the reading electrodes of the image detector (e.g., the flat plate-shaped electrode or the comb tooth-shaped electrodes). Particularly, in cases where the plurality of the line-shaped small wave sources are arrayed so as to stand side by side along the direction normal to the longitudinal direction of each small wave source, each of the line-shaped small wave sources may be constituted of a plurality of point-shaped small wave sources, which are arrayed in a line form. In such cases, quick readout can be performed (by virtue of the utilization of the line-shaped small wave sources), and the read-out sharpness can be enhanced.

As the surface-shaped wave source, specifically, the EL device, such as an organic EL device, or the liquid crystal may be utilized. The EL device and the liquid crystal are currently available easily. Therefore, the read-out apparatus for an image detector in accordance with the present invention can be produced easily. In particular, in cases where the organic EL device, which is provided with the dielectric multi-layer film located on the side facing the image detector, is utilized, the directivity of the EL light can be enhanced, and the read-out sharpness can be enhanced.

Further, in cases where the image detector, the current detecting means, the surface-shaped wave source, and the wave source control means are combined with one another, the apparatus can be formed as a portable type of apparatus, with which the electrostatic latent image can be read out immediately after the recording or whenever it is to be read out.

DESCRIPTION OF THE PREFERRED EMBODIMENTS

The present invention will hereinbelow be described in further detail with reference to the accompanying drawings.

Figure 1A:
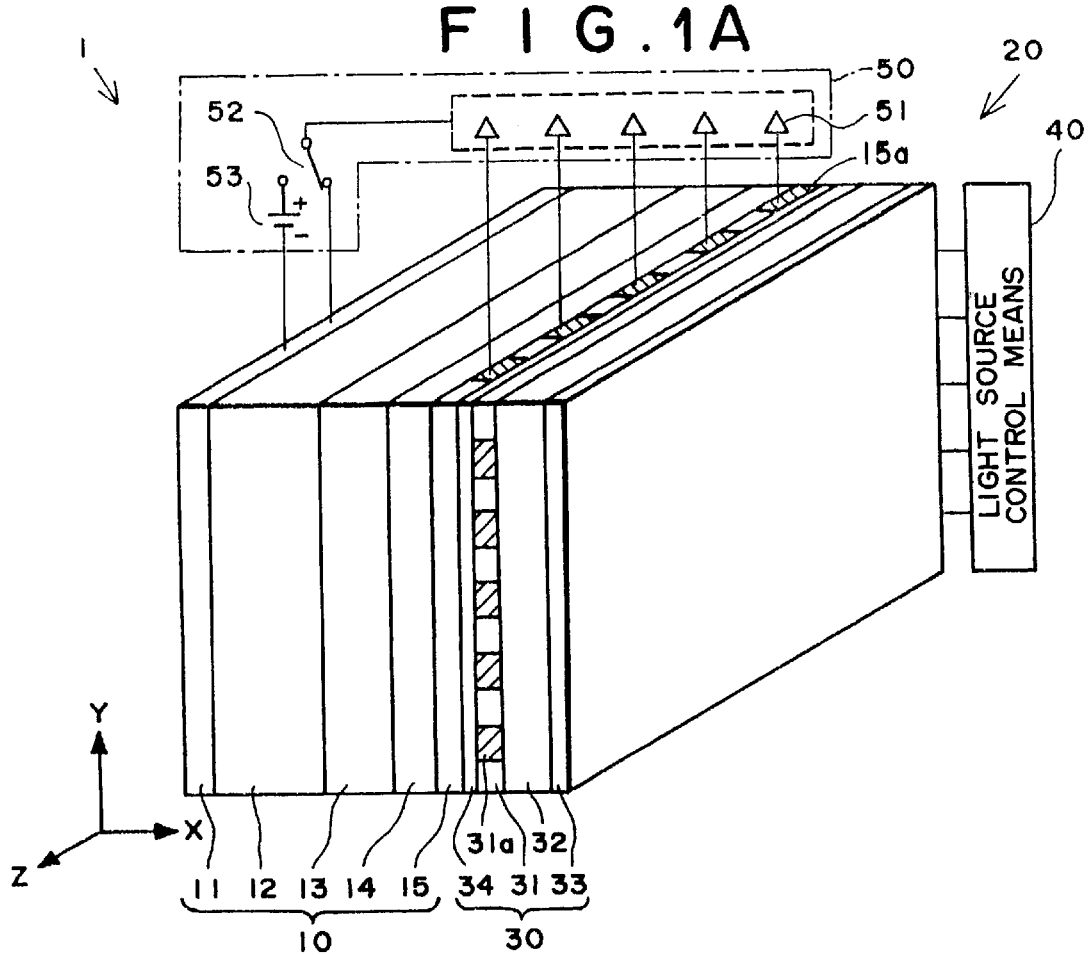
FIG. 1A is a perspective view showing an embodiment of the image detecting and read-out apparatus in accordance with the present invention, wherein an EL device is utilized as a light source and a radiation image is detected and read out.
Figure 1B:
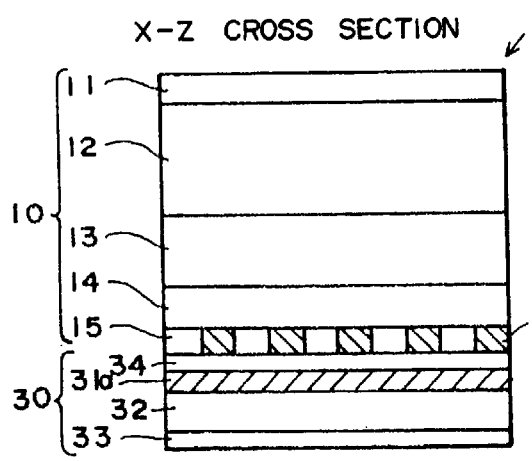
FIG. 1B is an X-Z cross-sectional view of FIG. 1A.
Figure 1C:
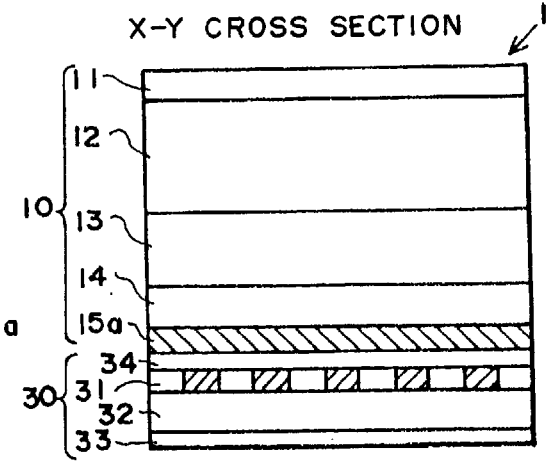
FIG. 1C is an X-Y cross-sectional view of FIG. 1A.

FIG. 1A is a perspective view showing an embodiment of the image detecting and read-out apparatus in accordance with the present invention, wherein an EL device is utilized as a light source and a radiation image is detected and read out. FIG. 1B is an X-Z cross-sectional view of FIG. 1A. FIG. 1C is an X-Y cross-sectional view of FIG. 1A. In FIG. 1A, light source control means (an example of wave source control means) 40, which controls part (an electric power source, and the like) of a recording apparatus for recording an electrostatic latent image on a radiation image detector 10 and a reading surface-shaped light source (an example of a surface-shaped wave source) 30, and current detecting means 50 are also shown. As illustrated in FIG. 1A, a radiation image detecting and read-out apparatus 1 is constituted of the radiation image detector 10 and a read-out apparatus 20 for the radiation image detector 10.

The radiation image detector 10 records radiation image information as an electrostatic latent image and generates electric currents in accordance with the electrostatic latent image when it is scanned with a reading electromagnetic wave (hereinbelow referred to as reading light). Specifically, the radiation image detector 10 comprises a first electrical conductor layer 11, which has permeability to recording radiation (e.g., X-rays). The recording radiation will hereinbelow be referred to as the recording light. The radiation image detector 10 also comprises a recording photo-conductive layer 12, which exhibits photo-conductivity when it is exposed to the recording light. The radiation image detector 10 further comprises a charge transporting layer 13, which acts approximately as an insulator with respect to electric charges (latent image polarity charges, e.g. negative charges) having a polarity identical with the polarity of electric charges occurring in the first electrical conductor layer 11, and which acts approximately as a conductor with respect to electric charges (transported polarity charges, positive charges in this example) having a polarity opposite to the polarity of the electric charges occurring in the first electrical conductor layer 11. The radiation image detector 10 still further comprises a reading photo-conductive layer 14, which exhibits photo-conductivity when it is exposed to reading light, and a second electrical conductor layer 15 having permeability to the reading light. The first electrical conductor layer 11, the recording photo-conductive layer 12, the charge transporting layer 13, the reading photo-conductive layer 14, and the second electrical conductor layer 15 are overlaid in this order. The second electrical conductor layer 15 is formed in a comb tooth shape. The comb tooth regions (hatched in FIG. 1A) of the second electrical conductor layer 15 will hereinbelow be referred to as comb tooth-shaped electrodes 15a, 15a, . . . (Reference may be made to the electrostatic recording material described in Japanese Patent Application No. 10(1998)-232824.)

The read-out apparatus 20 comprises the surface-shaped light source 30, the light source control means 40 for controlling the surface-shaped light source 30, and the current detecting means 50.

The surface-shaped light source 30 is constituted of an EL device. The surface-shaped light source 30 comprises an electrically conductive layer 31, an EL layer 32, and an electrically conductive layer 33. An insulation layer 34 is formed between the second electrical conductor layer 15 of the radiation image detector 10 and the electrically conductive layer 31 of the surface-shaped light source 30. The electrically conductive layer 31 is formed in a comb tooth shape so as to intersect (in this embodiment, approximately perpendicularly) with the comb tooth-shaped electrodes 15a, 15a, . . . of the radiation image detector 10. In this manner, the surface-shaped light source 30 is constituted such that a plurality of comb teeth 31a, 31a, . . . (hatched in FIG. 1A), which act as line-shaped light sources, are arrayed in a surface form. Each of the comb teeth 31a, 31a, . . . is connected to the light source control means 40. Also, each of the comb teeth 31a, 31a, . . . is formed from a material permeable to EL light produced by the EL layer 32. The electrically conductive layer 33 is formed as a flat plate-shaped electrode. The electrically conductive layer 33 is formed from a material, which totally reflects the EL light produced by the EL layer 32.

Figure 2A:
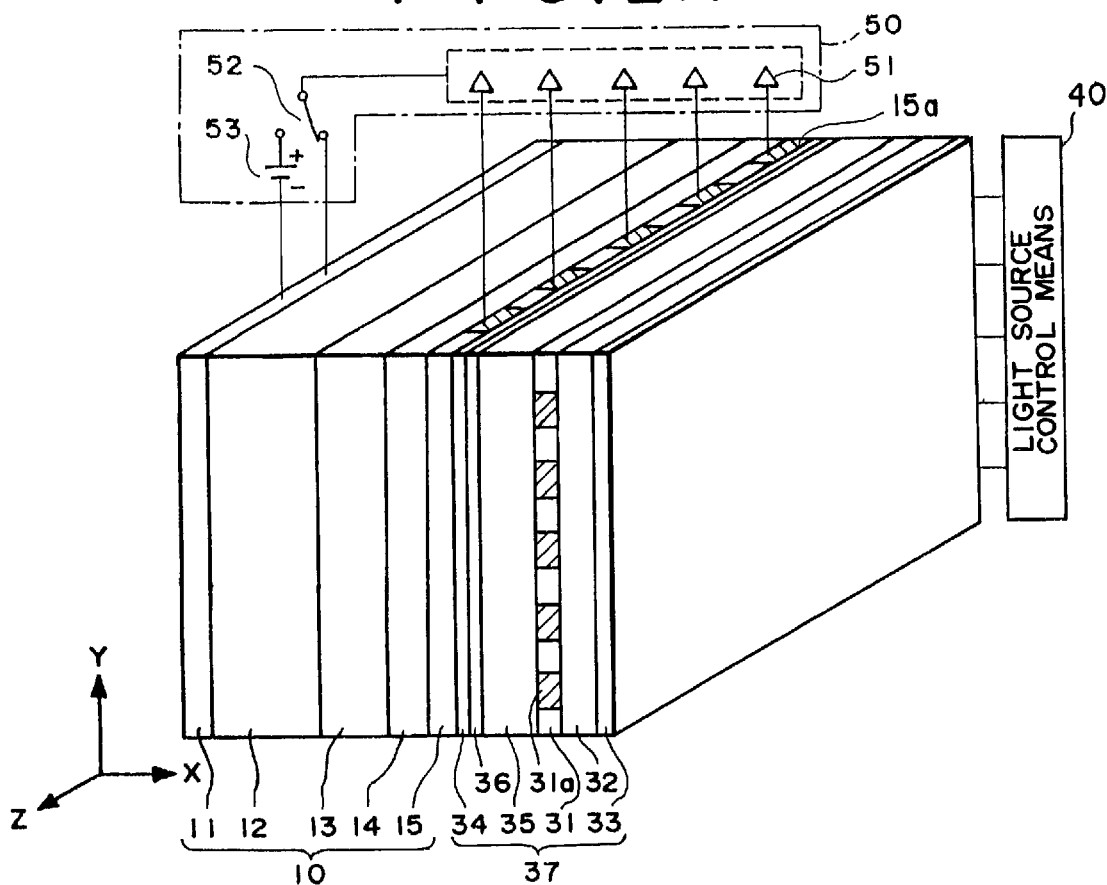
FIG. 2A is a perspective view showing an embodiment of the image detecting and read-out apparatus in accordance with the present invention, wherein an organic EL device is utilized as a light source and a radiation image is detected and read out.
Figure 2B:
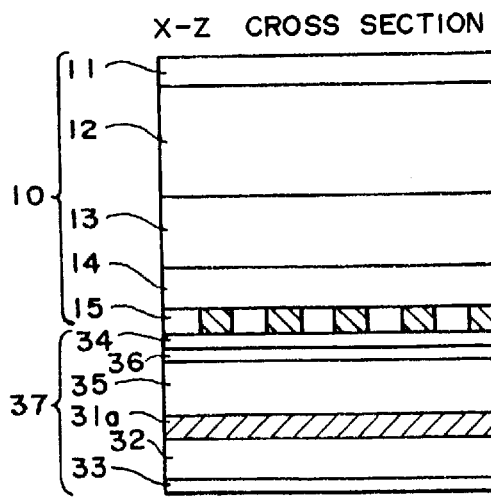
FIG. 2B is an X-Z cross-sectional view of FIG. 2A.
Figure 2C:
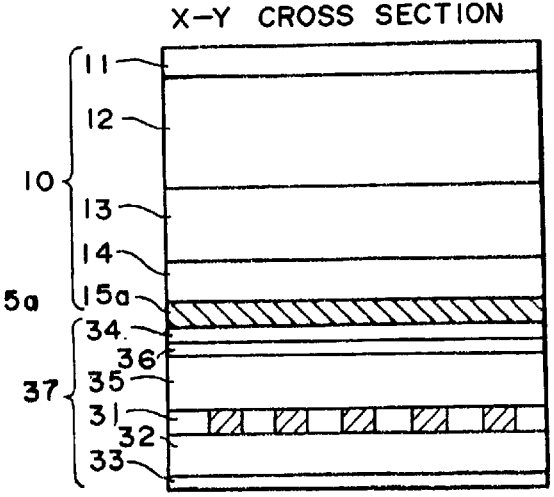
FIG. 2C is an X-Y cross-sectional view of FIG. 2A.

The EL layer 32 may be an inorganic EL layer formed from an inorganic material, or may be an organic EL layer formed from an organic material. As illustrated in FIGS. 2A, 2B, and 2C, in cases where the EL layer 32 is an organic EL layer, an organic EL device, which comprises a transparent substrate 35 and a dielectric multi-layer film 36 overlaid in this order upon the electrically conductive layer 31, should preferably be utilized as a surface-shaped light source 37. In cases where the dielectric multi-layer film 36 is overlaid in this manner, the directivity of the EL light can be enhanced, and the read-out sharpness can be enhanced. In cases where the EL layer 32 is constituted of the organic EL layer, the thickness of the EL layer 32 can be kept thin.

The wavelengths of the EL light produced by the EL layer 32 contain wavelengths appropriate for reading the electrostatic latent image from the radiation image detector 10. Also, the wavelengths of the EL light produced by the EL layer 32 should preferably contain wavelengths appropriate as pre-exposure light, which will be described later. The term "containing wavelengths appropriate for reading an electrostatic latent image from a radiation image detector 10" as used herein means that the wavelengths of the EL light produced by the EL layer 32 should preferably be set in accordance with the materials of the charge transporting layer 13 and the reading photo-conductive layer 14 constituting the radiation image detector 10. In order for the wavelengths of the EL light produced by the EL layer 32 to be set, the material of the EL layer 32 should preferably be selected. For example, the reading photo-conductive layer 14 may contain, as a principal constituent, at least one constituent selected from the group consisting of a-Se, $PdI_2$, $Bi_{12}(Ge, Si)O_{20}$, perylene bis-imide (R=n-propyl), and perylene bis-imide (R=n-neopentyl), may have a high sensitivity to light having wavelengths (300 nm to 550 nm) of the near ultraviolet to blue region, and may have a low sensitivity to light having wavelengths of the red region. In such cases, the EL layer 32 may be formed from a distyryl allylene derivative, or the like, such that the light having wavelengths of the near ultraviolet to blue region may be produced by the EL layer 32. The light having wavelengths of the near ultraviolet to blue region is appropriate also as the pre-exposure light.

The light source control means 40 applies a predetermined voltage across the comb teeth 31a, 31a, . . . and the electrically conductive layer 33, which stands facing the comb teeth 31a, 31a, . . . . The voltage is applied successively to the comb teeth 31a, 31a, . . . . Alternatively, the voltage is applied simultaneously to several comb teeth 31a, 31a, . . . or all of them. By the application of the voltage, the EL light is produced by the EL layer 32 and is utilized as the reading light or the pre-exposure light.

The current detecting means 50 has a plurality of current detection amplifiers 51, 51, . . . , each of which is connected to one of the comb tooth-shaped electrodes 15a, 15a, . . . of the second electrical conductor layer 15. The current detecting means 50 detects electric currents, which flow through the comb tooth-shaped electrodes 15a, 15a, due to exposure to the reading light, in a parallel manner. The first electrical conductor layer 11 of the radiation image detector 10 is connected to one of input terminals of a connection means 52 and to a negative pole of an electric power source 53. A positive pole of the electric power source 53 is connected to the other input terminal of the connection means 52. Though not shown in FIG. 1A, an output terminal of the connection means 52 is connected to each of the current detection amplifiers 51, 51, . . . . The current detection amplifiers 51, 51, . . . may have one of various known constitutions. The manner in which the connection means 52 and the electric power source 53 are connected varies for different constitutions of the current detection amplifiers 51, 51, . . . .

How the radiation image detecting and read-out apparatus 1 operates will be described hereinbelow.

When the electrostatic latent image is to be recorded on the radiation image detector 10, firstly, the connection of the connection means 52 is changed over to the side of the electric power source 53, and a d.c. voltage is applied across the first electrical conductor layer 11 and the comb tooth-shaped electrodes 15a, 15a, . . . of the second electrical conductor layer 15. In this manner, the first electrical conductor layer 11 and the second electrical conductor layer 15 are electrically charged. As a result, shaped electric field having the concavity of the U-shape at the comb tooth-shaped electrode 15a is formed between the first electrical conductor layer 11 and the comb tooth-shaped electrode 15a in the radiation image detector 10.

Thereafter, the recording light is irradiated to an object (not shown), and the recording light having passed through the object, i.e. radiation carrying radiation image information of the object, is irradiated to the radiation image detector 10. As a result, pairs of positive and negative charges occur in the recording photo-conductive layer 12 of the radiation image detector 10. Of the pairs of positive and negative charges, the negative charges are centralized upon the comb tooth-shaped electrodes 15a, 15a, . . . along the electric field distribution described above. In this manner, the negative charges are accumulated at the interface between the recording photo-conductive layer 12 and the charge transporting layer 13. The amount of the accumulated negative charges (the latent image charges) is approximately in proportion to the dose of radiation delivered to the radiation image detector 10. Therefore, the latent image charges carry the electrostatic latent image. In this manner, the electrostatic latent image is recorded on the radiation image detector 10. The positive charges occurring in the recording photo-conductive layer 12 are attracted to the first electrical conductor layer 11, combine with negative charges injected from the electric power source 53, and disappear.

When the electrostatic latent image is to be read out from the radiation image detector 10, firstly, the connection of the connection means 52 is changed over to the side of the first electrical conductor layer 11 of the radiation image detector 10.

Thereafter, the light source control means 40 applies a predetermined d.c. voltage across each of the comb teeth 31a, 31a, . . . and the electrically conductive layer 33. The voltage application is performed by successively changing over the comb teeth 31a, 31a, . . . . By the application of the d.c. voltage, the EL light is produced by the region of the EL layer 32, which is sandwiched between each comb tooth 31a and the electrically conductive layer 33. Since each comb tooth 31a has the line-like shape, the EL light having passed through the comb tooth 31a can be utilized as line-like reading light. Specifically, the surface-shaped light source 30 is equivalent to a light source comprising a plurality of line-shaped small light sources, which are arrayed in a surface form. In cases where the EL light is produced by successively changing over the comb teeth 31a, 31a, . . . , the radiation image detector 10 is electrically scanned with the reading light.

Thereafter, the line-like reading light passes through the comb tooth-shaped electrodes 15a, 15a, . . . of the second electrical conductor layer 15 of the radiation image detector 10. As a result, pairs of positive and negative charges occur in the reading photo-conductive layer 14. Of the pairs of positive and negative charges, the positive charges move quickly through the charge transporting layer 13 so as to be attracted by the negative charges (the latent image charges), which have been accumulated at the interface between the recording photo-conductive layer 12 and the charge transporting layer 13. The positive charges combine with the latent image charges at the interface between the recording photo-conductive layer 12 and the charge transporting layer 13 and disappear. The negative charges occurring in the reading photo-conductive layer 14 combine with positive charges, which are injected from the electric power source 53 into the second electrical conductor layer 15, and disappear. In this manner, the negative charges having been accumulated in the radiation image detector 10 disappear through charge re-combination, and electric currents due to the movement of the electric charges at the time of the charge re-combination occur in the radiation image detector 10. The electric currents are detected for the respective comb tooth-shaped electrodes 15a, 15a, . . . in a parallel manner by the current detection amplifiers 51, 51, . . . , each of which is connected to one of the comb tooth-shaped electrodes 15a, 15a, . . . . The electric currents flowing through the radiation image detector 10 at the time of the readout occur in accordance with the latent image charges, i.e. the electrostatic latent image. Therefore, the electrostatic latent image can be read out by detecting the electric currents.

In cases where the d.c. voltage is applied by successively changing over the comb teeth 31a, 31a, . . . of the electrically conductive layer 31 for reading out the electrostatic latent image in the manner described above, the problems occur in that electromagnetic noise occurs due to the change-over and enters into the radiation image detector 10. As a result, noise is superposed upon the currents flowing through the radiation image detector 10, and noise appears on the read-out image. In order to prevent noise from occurring due to electromagnetic noise, electromagnetic shield means should preferably be located between the radiation image detector 10 and the surface-shaped light source 30. As the electromagnetic shield means, for example, a transparent, electrically conductive layer formed from indium tin oxide (ITO), or the like, may be utilized. The electromagnetic shield means should more preferably be formed so as to surround the entire radiation image detector 10.

With the radiation image detecting and read-out apparatus 1 comprising the radiation image detector 10 and the read-out apparatus 20, which are combined with each other, the radiation image detector 10 is scanned with the line-like reading light produced by the surface-shaped light source 30 of the read-out apparatus 20. The scanning is performed with electrical scanning by successively changing over the comb teeth 31a, 31a, . . . . Therefore, it is unnecessary for mechanical scanning as in conventional techniques to be performed for the scanning with the reading light. As a result, the number of parts can be kept small, and a simple, cheap, and small read-out apparatus can be formed. Also, since the mechanical scanning is not performed, the scanning system need not be provided with movable parts. Accordingly, the reliability of the read-out apparatus can be enhanced. Further, since the radiation image detector 10 and the read-out apparatus 20 are combined with each other, the apparatus can be formed as a portable type of apparatus.

Basically, with the radiation image detecting and read-out apparatus 1, after the electrostatic latent image has been read out from the radiation image detector 10, no latent image charge will remain in the radiation image detector 10, and the radiation image detector 10 can be used again for recording an electrostatic latent image. However, it often occurs that the latent image charges do not disappear perfectly as a result of the read-out operation and remain as residual charges in the radiation image detector 10. Also, before the radiation image detector 10 is exposed to the recording light for recording the electrostatic latent image, a high voltage is applied to the radiation image detector 10. At the time of the application of the high voltage, dark current occurs, and electric charges (dark current charges) due to the dark current are accumulated in the radiation image detector 10. Further, it has been known that electric charges are accumulated in the radiation image detector 10 due to other causes prior to the exposure to the recording light. The unnecessary electric charges, such as the residual charges and the dark current charges, which are accumulated in the radiation image detector 10 prior to the exposure to the recording light, are added to the electric charges carrying the image information, which are accumulated when the radiation image detector 10 is exposed to the recording light. Therefore, a signal, which is detected when the electrostatic latent image is read out from the radiation image detector 10, contains signal components, which correspond to the electric charges carrying the image information, and signal components corresponding to the unnecessary electric charges. As a result, the problems concerning a residual image phenomenon and a low signal to-noise ratio occur.

Accordingly, such that the unnecessary electric charges accumulated in the radiation image detector 10 may be erased and the problems concerning a residual image phenomenon and a low signal-to-noise ratio may be eliminated, pre-exposure may be performed by irradiating predetermined light to the radiation image detector 10 before the recording light is irradiated to the radiation image detector 10. (The pre-exposure is described in Japanese Patent Application No. 10(1998)-232824.)

The radiation image detecting and read-out apparatus 1 in accordance with the present invention is constituted such that the surface-shaped light source 30 can produce the light for pre-exposure. Specifically, a predetermined voltage is applied simultaneously across a plurality of the comb teeth 31a, 31a, . . . and the electrically conductive layer 33. At this time, it is sufficient for the pre-exposure light, which is produced by the EL layer 32 due to the application of the voltage, to be irradiated approximately uniformly to the radiation image detector 10, and no limitation is imposed upon the number of the comb teeth 31a, 31a, . . . to which the voltage is applied. For example, the voltage may be applied to several comb teeth 31a, 31a, which are selected at predetermined intervals, or to all of the comb teeth 31a, 31a, As described above, with the radiation image detecting and read-out apparatus 1, the reading light and the pre-exposure light are produced by the single same light source. Therefore, the number of parts of the apparatus can be kept small, and a cheap apparatus can be formed.

The pre-exposure light may have wavelengths identical with the wavelengths of the reading light. Alternatively, the pre-exposure light may have wavelengths appropriate for the pre-exposure, i.e. wavelengths different from the wavelengths of the reading light. In cases where an EL layer capable of producing multi-color light is utilized, the reading light having certain wavelengths and the pre-exposure light having different wavelengths can be produced. Since the pre-exposure light can be obtained by merely altering the wavelengths of the produced light, the problems can be prevented from occurring in that the size of the apparatus becomes large for obtaining the pre-exposure light. With the aforesaid system described in U.S. Pat. No. 5,510,626, means for cutting out light having wavelengths for readout must be utilized, and therefore the system becomes large.

Also, with the aforesaid system described in the Literature 2, primary exposure must be performed for the pre-charging prior to final recording. However, with the radiation image detecting and read-out apparatus 1 in accordance with the present invention, light for the primary exposure can be produced by the light source for readout, and the light source for readout can thus be utilized also as the light source for the primary exposure.

In the embodiment described above, the electrically conductive layer 33 of the surface-shaped light source 30 has the flat plate-shaped electrode structure. Alternatively, the electrically conductive layer 33 may be formed in a comb tooth-like shape and may be located such that the comb teeth of the electrically conductive layer 33 are parallel with the comb tooth-shaped electrodes 15a, 15a, . . . of the radiation image detector 10. In such cases, when the comb teeth 31a, 31a, . . . are changed over successively during the readout, a d.c. voltage is applied across all of the comb teeth of the electrically conductive layer 33 and each of the comb teeth 31a, 31a, . . . . In cases where the electrically conductive layer 33 is formed in the comb tooth-like shape, approximately point-like EL light can be obtained with the comb teeth of the electrically conductive layer 33. Therefore, the read-out apparatus can be constituted, wherein the readout is performed by successively changing over the line light sources, each of which is constituted of a plurality of point-shaped small light sources (small point light sources) arrayed in a line shape. With the small point light sources, the read-out sharpness can be enhanced.

Also, in the embodiment described above, the surface-shaped light source 30 is constituted of the EL device such that the electrically conductive layer 31 has the comb tooth-like shape. Alternatively, a known simple matrix-like EL device, which produces point-like EL light, may be utilized as the surface-shaped light source 30. In such cases, the surface-shaped light source 30 is equivalent to a light source, which comprises a plurality of point-like small light sources arrayed in a matrix form.

In such cases, when the electrostatic latent image is to be read out, elements of the EL device constituting the matrix are activated one after another by the light source control means 40.

Also, when the pre-exposure is to be performed, a plurality of the elements of the EL device constituting the matrix are activated simultaneously. At this time, it is sufficient for the pre-exposure light to be irradiated approximately uniformly to the radiation image detector 10, and no limitation is imposed upon the number of the elements, which are activated. For example, several elements selected at predetermined intervals may be activated, or all of the elements may be activated.

In cases where the surface-shaped light source 30 (including the cases of the EL device), which comprises a plurality of point-like small light sources arrayed in the matrix form, is utilized, the second electrical conductor layer 15 of the radiation image detector 10 may be constituted of the comb tooth-shaped electrodes or a flat plate-shaped electrode. In cases where the second electrical conductor layer 15 of the radiation image detector 10 is constituted of the flat plate-shaped electrode, it is sufficient for only a single current detection amplifier to be provided.

Figure 3A:
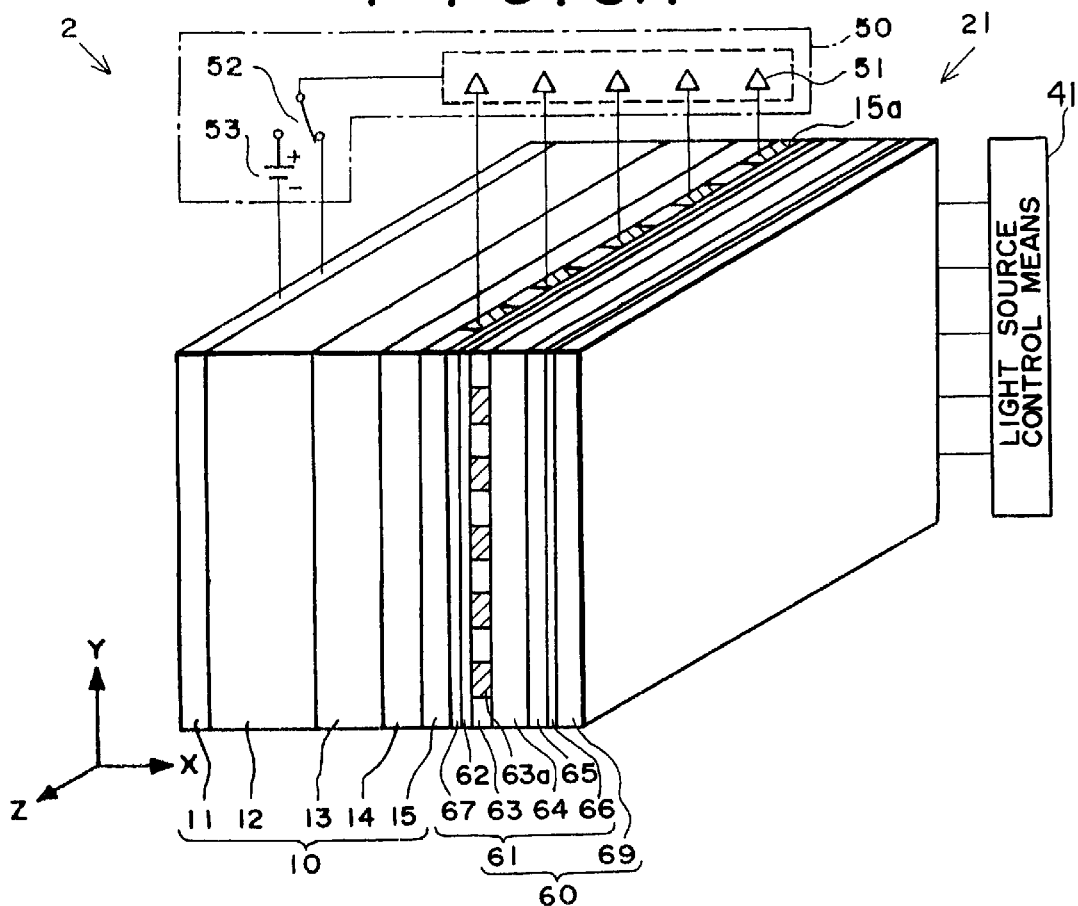
FIG. 3A is a perspective view showing an embodiment of the image detecting and read-out apparatus in accordance with the present invention, wherein a liquid crystal is utilized as a light source and a radiation image is detected and read out.
Figure 3B:
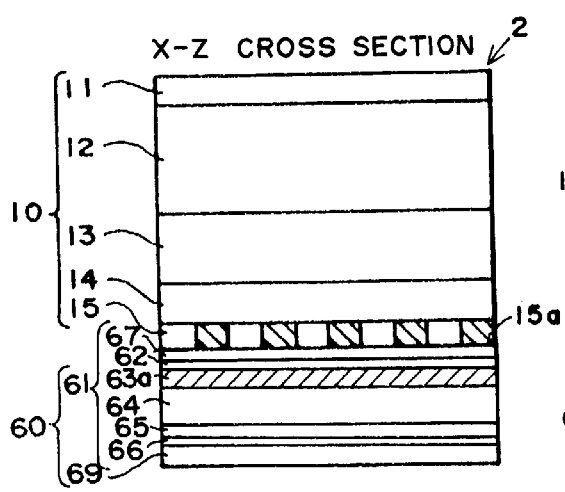
FIG. 3B is an X-Z cross-sectional view of FIG. 3A.
Figure 3C:
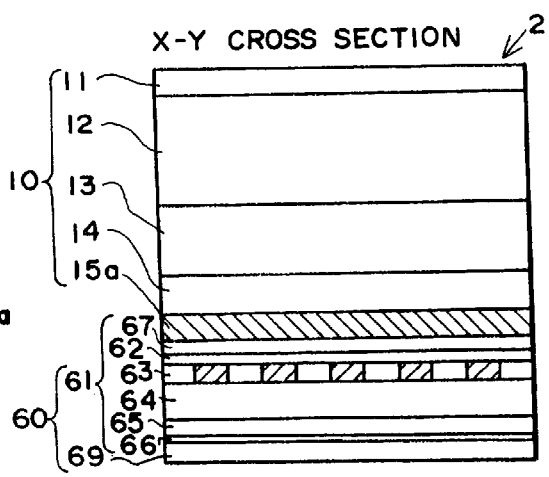
FIG. 3C is an X-Y cross-sectional view of FIG. 3A.

An embodiment of the image detecting and read-out apparatus in accordance with the present invention, wherein a liquid crystal is utilized as a light source and a radiation image is detected and read out, will be described hereinbelow. FIG. 3A is a perspective view showing such an embodiment. FIG. 3B is an X-Z cross-sectional view of FIG. 3A. FIG. 3C is an X-Y cross-sectional view of FIG. 3A. In FIG. 3A, light source control means (an example of wave source control means) 41, which controls part of a recording apparatus for recording an electrostatic latent image on the radiation image detector 10 and a reading surface-shaped light source (an example of a surface-shaped wave source) 60, and the current detecting means 50 are also shown.

As illustrated in FIG. 3A, a radiation image detecting and read-out apparatus 2 is constituted of the radiation image detector 10 and a read-out apparatus 21 for the radiation image detector 10. The radiation image detector 10 is constituted in the same manner as that in the radiation image detector 10 of the aforesaid radiation image detecting and read-out apparatus 1.

The surface-shaped light source 60 comprises a liquid crystal pane 161 and a back light source 69. The liquid crystal panel 61 comprises a polarizing film 62, an electrode layer 63, a liquid crystal layer 64, an electrode layer 65, and a polarizing film 66, which are overlaid in this order. The back light source 69 is located on the side of the polarizing film 66. The radiation image detector 10, the liquid crystal panel 61, and the back light source 69 are combined with one another such that the polarizing film 62 may be located on the side of the radiation image detector 10. An insulation layer 67 is formed between the second electrical conductor layer 15 of the radiation image detector 10 and the polarizing film 62 of the surface-shaped light source 60.

The electrode layer 63 is formed in a comb tooth shape so as to intersect (in this embodiment, approximately perpendicularly) with the comb tooth-shaped electrodes 15a, 15a, . . . of the radiation image detector 10. In this manner, the surface-shaped light source 60 is constituted such that a plurality of comb teeth 63a, 63a, . . . , which act as line-shaped light sources, are arrayed in a surface form. Each of the comb teeth 63a, 63a, . . . is connected to the light source control means 41. Also, each of the comb teeth 63a, 63a, . . . is formed from a material permeable to back light, which is produced by the back light source 69 and has passed through the liquid crystal layer 64. The electrode layer 65 is formed as a flat plate-shaped electrode. The electrode layer 65 is formed from a material, which transmits the back light produced by the back light source 69.

The polarizing film 62 and the polarizing film 66 act such that the back light, which has been produced by the back light source 69 and has passed through the liquid crystal layer 64, may impinge straightly upon the radiation image detector 10. Specifically, the polarizing film 62 and the polarizing film 66 act such that only the light, which has been polarized by the liquid crystal layer 64 and travels in a specific direction (in this embodiment, in the direction straight toward the radiation image detector 10), may impinge upon the radiation image detector 10.

The wavelengths of the light impinging upon the radiation image detector 10 contain wavelengths appropriate for reading the electrostatic latent image from the radiation image detector 10. Also, the wavelengths of the light impinging upon the radiation image detector 10 should preferably contain wavelengths appropriate as pre-exposure light described above. As described above, the term "containing wavelengths appropriate for reading an electrostatic latent image from a radiation image detector 10" as used herein means that the wavelengths of the light impinging upon the radiation image detector 10 should preferably be set in accordance with the materials of the charge transporting layer 13 and the reading photo-conductive layer 14 constituting the radiation image detector 10. For such purposes, a back light source 69 capable of producing the light having such wavelengths may be utilized. Alternatively, a wavelength adjusting optical filter may be located between the radiation image detector 10 and the back light source 69.

The light source control means 41 applies a predetermined voltage across the comb teeth 63a, 63a, . . . and the electrode layer 65. The voltage is applied successively to the comb teeth 63a, 63a, . . . . Alternatively, the voltage is applied simultaneously to several comb teeth 63a, 63a, . . . or all of them. By the application of the voltage, the back light produced by the back light source 69 is polarized by the liquid crystal layer 64, is converted into the light traveling straightly to the radiation image detector 10, and impinges upon the radiation image detector 10. Since the comb teeth 63a, 63a, . . . have the line-like shape, the back light having passed through the comb teeth 63a, 63a, . . . also has a line-like shape. Specifically, when the voltage is applied, the back light can be utilized as the line-like reading light. More specifically, the surface-shaped light source 60 is equivalent to a light source comprising a plurality of line-shaped small light sources, which are arrayed in a surface form. In cases where the comb teeth 63a, 63a, . . . are changed over successively, the radiation image detector 10 is electrically scanned with the line-like reading light.

Therefore, in this embodiment, the light source control means 41 applies the predetermined d.c. voltage across each of the comb teeth 63a, 63a, . . . and the electrode layer 65 by successively changing over the comb teeth 63a, 63a, . . . In this manner, the electrostatic latent image can be read out by electrically scanning the radiation image detector 10.

Accordingly, in cases where the liquid crystal panel is utilized as the light source as in this embodiment, it is unnecessary for mechanical scanning as in conventional techniques to be performed for the scanning with the reading light. As a result, the number of parts can be kept small, and a simple, cheap, and small read-out apparatus can be formed. Also, the reliability of the read-out apparatus can be enhanced. Further, since the radiation image detector 10 and the read-out apparatus 21 are combined with each other, the apparatus can be formed as a portable type of apparatus.

In this embodiment, in cases where the d.c. voltage is applied by successively changing over the comb teeth 63a, 63a, . . . of the electrode layer 63, the problems occur in that electromagnetic noise occurs due to the change-over. Therefore, as in the aforesaid radiation image detecting and read-out apparatus 1 utilizing the EL device as the surface-shaped light source 30, the electromagnetic shield means should preferably be located between the radiation image detector 10 and the surface-shaped light source 60, and current noise due to the electromagnetic noise should preferably be prevented.

Also, as in the radiation image detecting and read-out apparatus 1 utilizing the EL device as the surface-shaped light source 30, the pre-exposure can be performed by applying a predetermined voltage simultaneously across a plurality of the comb teeth 63a, 63a, . . . and the electrode layer 65, and irradiating approximately uniform light to the radiation image detector 10. At this time, no limitation is imposed upon the number of the comb teeth 63a, 63a, . . . to which the voltage is applied.

Further, the electrode layer 65 may be formed in a comb tooth-like shape and may be located such that the comb teeth of the electrode layer 65 are parallel with the comb tooth-shaped electrodes 15a, 15a, . . . of the radiation image detector 10. In cases where the electrode layer 65 is formed in the comb tooth-like shape, the back light polarized by the liquid crystal layer 64 can be obtained as approximately point-like back light with the comb teeth of the electrode layer 65. Therefore, the read-out apparatus can be constituted, wherein the readout is performed by successively changing over the line light sources, each of which is constituted of a plurality of point-shaped small light sources (small point light sources) arrayed in a line shape. With the small point light sources, the read-out sharpness can be enhanced.

Furthermore, in this embodiment, a known simple matrix type of liquid crystal panel may be employed. In such cases, the surface-shaped light source 60 is equivalent to a light source, which comprises a plurality of point-like small light sources arrayed in a matrix form.

In such cases, when the electrostatic latent image. is to be read out, liquid crystal driving elements (e.g., TFT's), which are arrayed in the matrix form, are driven one after another by the light source control means 41. In this manner, the reading light is entered from the area (corresponding to a pixel) of the liquid crystal panel, which corresponds to the driven element, into the radiation image detector 10.

Also, when the pre-exposure is to be performed, a plurality of the liquid crystal driving elements are driven simultaneously. At this time, it is sufficient for the pre-exposure light to be irradiated approximately uniformly to the radiation image detector 10, and no limitation is imposed upon the number of the elements, which are driven. For example, several elements selected at predetermined intervals may be driven, or all of the elements may be driven.

In cases where the simple matrix type of liquid crystal panel is utilized, the second electrical conductor layer 15 of the radiation image detector 10 may be constituted of the comb tooth-shaped electrodes or a flat plate-shaped electrode.

Figure 4A:
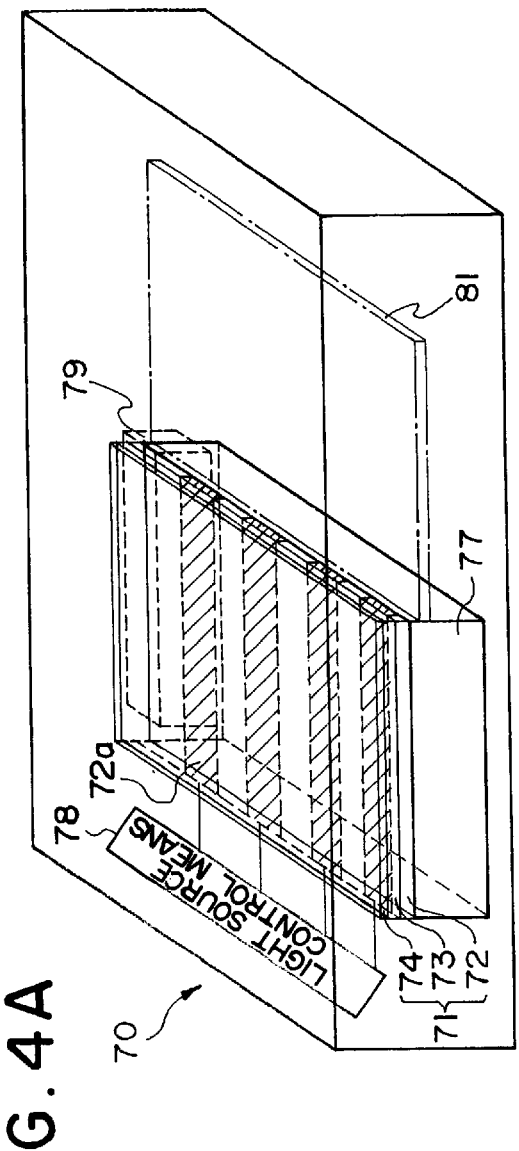
FIG. 4A is a perspective view showing an embodiment of the read-out apparatus for an image detector in accordance with the present invention.
Figure 4B:
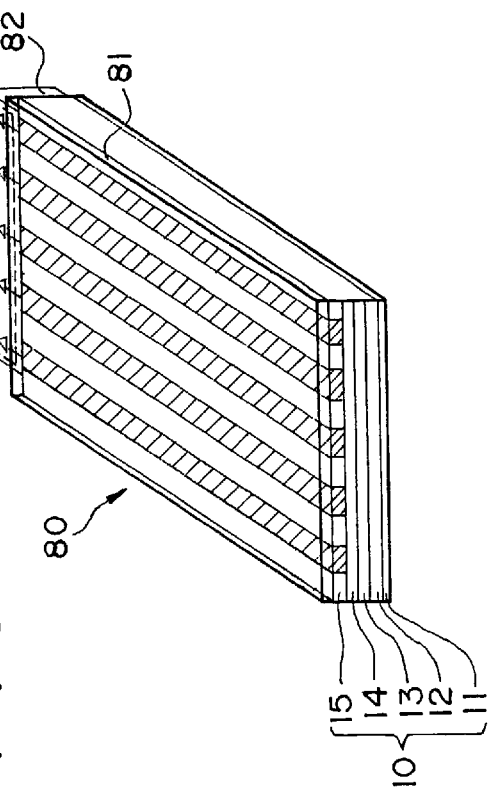
FIG. 4B is a perspective view showing a detector casing, for which the embodiment of FIG. 4A is utilized.

An embodiment of the read-out apparatus for an image detector in accordance with the present invention will be described hereinbelow. FIG. 4A is a perspective view showing a read-out apparatus 70. FIG. 4B is a perspective view showing a detector casing 80, which accommodates the radiation image detector 10 of the aforesaid radiation image detecting and read-out apparatus 1.

The read-out apparatus 70 comprises a surface-shaped light source 71, light source control means 78, and an interface section 79. A detector receiving section 77 capable of accommodating the detector casing 80 is formed in a side face (a front side face in FIG. 4A) of the read-out apparatus 70.

The surface-shaped light source 71 has the same constitution as the constitution of the surface-shaped light source 30 of the aforesaid radiation image detecting and read-out apparatus 1. Also, the light source control means 78 has the same constitution as the constitution of the light source control means 40 of the aforesaid radiation image detecting and read-out apparatus 1. The surface-shaped light source 71 is constituted of the EL device and comprises an electrically conductive layer 72, an EL layer 73, and an electrically conductive layer 74. The surface-shaped light source 71 is located such that the electrically conductive layer 72 stands facing the top surface of the detector receiving section 77. Electromagnetic shield means should preferably be located between the surface-shaped light source 71 and the top surface of the detector receiving section 77. The electromagnetic shield means should more preferably be located so as to cover the entire inner walls of the detector receiving section 77.

The electrically conductive layer 72 of the surface-shaped light source 71 is formed in a comb tooth shape so as to intersect (in this embodiment, approximately perpendicularly) with the comb tooth-shaped electrodes 15a, 15a, . . . of the radiation image detector 10 when the detector casing 80 has been accommodated in the detector receiving section 77. In this manner, the surface-shaped light source 71 is constituted such that a plurality of comb teeth 72a, 72a, . . . (hatched in FIG. 4A), which act as line-shaped light sources, are arrayed in a surface form. Each of the comb teeth 72a, 72a, . . . is connected to the light source control means 78. Also, each of the comb teeth 72a, 72a, is formed from a material permeable to the EL light produced by the EL layer 73. The electrically conductive layer 74 is formed as a flat plate-shaped electrode. The electrically conductive layer 74 is formed from a material, which totally reflects the EL light produced by the EL layer 73.

The detector casing 80 accommodates the radiation image detector 10 and the current detecting means 50 of the aforesaid radiation image detecting and read-out apparatus 1.

The radiation image detector 10 is accommodated in the detector casing 80 such that the comb tooth-shaped electrodes 15a, 15a, . . . may stand facing up in FIG. 4B. The side of the detector casing 80 close to the comb tooth-shaped electrodes 15a, 15a, . . . of the radiation image detector 10 is permeable to the light produced by the surface-shaped light source 71 of the read-out apparatus 70. A light shutter 81 is located between the side of the comb tooth-shaped electrodes 15a, 15a, . . . of the radiation image detector 10 and the detector casing 80. When the detector casing 80 is not accommodated in the detector receiving section 77, the light shutter 81 prevents light from impinging upon the radiation image detector 10. As indicated by the chained line in FIG. 4A, when the detector casing 80 has been accommodated in the detector receiving section 77, the light shutter 81 is slid and allows the light produced by the surface-shaped light source 71 to impinge upon the side of the comb tooth-shaped electrodes 15a, 15a, . . . of the radiation image detector 10. The read-out apparatus 70 is provided with means (not shown) for automatically sliding the light shutter 81 when the detector casing 80 has been accommodated in the detector receiving section 77.

An interface section 82 is located on the leading side of the detector casing 80, which is fitted into the deep region of the read-out apparatus 70. The interface section 82 contains the current detecting means 50 and interface means, which is to be electrically connected to the interface section 79 of the read-out apparatus 70. Alternatively, the current detecting means 50 may be located on the side of the read-out apparatus 70.

When the electrostatic latent image having been recorded on the radiation image detector 10 is to be read out with the read-out apparatus 70, firstly, the detector casing 80 is accommodated in the detector receiving section 77. At this time, the interface section 79 of the read-out apparatus 70 and the interface section 82 of the detector casing 80 are connected to each other, and the radiation image detector 10 and the read-out apparatus 70 are electrically connected to each other. Also, the light shutter 81 of the detector casing 80 is slid, and the surface-shaped light source 71 and the side of the radiation image detector 10 provided with the comb tooth-shaped electrodes 15a, 15a, stand facing each other. In this manner, the readout becomes possible.

Production of the reading light by the surface-shaped light source 71 and the readout of the electrostatic latent image from the radiation image detector 10 are performed in the same manner as that in the radiation image detecting and read-out apparatus 1 described above.

In the embodiment of the read-out apparatus 70, the surface-shaped light source 71 has the same constitution as the constitution of the surface-shaped light source 30 of the radiation image detecting and read-out apparatus 1 described above. However, the read-out apparatus for an image detector in accordance with the present invention is not limited to such an embodiment. Specifically, one of various other surface-shaped light sources may be employed, which are appropriate for the readout of the electrostatic latent image from the radiation image detector accommodated in the detector casing 80, i.e. which correspond to the radiation image detector. Therefore, the surface-shaped light source of the integral type of the image detecting and read-out apparatus described above may be located in the read-out apparatus, and the radiation image detector of the integral type of the image detecting and read-out apparatus described above may be accommodated in the detector casing 80.

In the embodiments described above, the EL device or the liquid crystal is utilized as the surface-shaped light source. However, the surface-shaped wave source employed in the present invention is not limited to the EL device and the liquid crystal. Specifically, the surface-shaped wave source may comprise a plurality of small wave sources, each of which produces the reading electromagnetic wave and which are arrayed in a surface form. For example, the surface-shaped wave source may be constituted of a plurality of point-shaped small wave sources, which are arrayed in a matrix form. Alternatively, the surface-shaped wave source may be constituted of a plurality of line-shaped small wave sources, which are arrayed so as to stand side by side along the direction normal to the longitudinal direction of each small wave source. Specifically, a plurality of small point light sources having a circular shape, such as LED's, may be arrayed in a matrix form. Alternatively, a plurality of line-shaped LED's, or the like, may be arrayed so as to stand side by side along the direction normal to the longitudinal direction of each LED, or the like. As another alternative, a plurality of small point light sources having a circular shape, such as LED's, may firstly be arrayed in a line shape, and then the line-shaped LED groups may be arrayed so as to stand side by side along the direction normal to the longitudinal direction of each LED group. In cases where a plurality of small point light sources are firstly arrayed in a line shape, the small point light sources constituting each line-shaped LED group are driven simultaneously.

Also, in the embodiments described above, the electrostatic recording material described in Japanese Patent Application No. 10(1998)-232824 is employed as the radiation image detector 10. However, the radiation image detector 10 is not limited to the electrostatic recording material. Specifically, one of various other radiation image detectors may be employed, which generates electric currents in accordance with the latent image charges carrying the radiation image information when being scanned with a reading electromagnetic wave (including the cases of light).

The reading electromagnetic wave includes the cases of light. However, the reading electromagnetic wave may be one of various other kinds of electromagnetic waves, with which the electrostatic latent image can be read out from the radiation image detector. For example, the reading electromagnetic wave may be radiation, such as X-rays.

Further, in the embodiments described above, the radiation image detector, which is capable of recording the radiation image information as the electrostatic latent image when being exposed to radiation carrying the radiation image information, is employed as the image detector, and the electrostatic latent image carrying the radiation image information is read out. However, the image detector employed in the present invention may be an image detector, which is capable of recording image information as the electrostatic latent image when being exposed to light (not limited to visible light). For example, in the radiation image detector 10 described above, the first electrical conductor layer 11 may be permeable to visible light, which acts as the recording light and which carries image information, and the recording photo-conductive layer 12 may exhibit electrical conductivity when being exposed to the recording light. Alternatively, a fluorescent material screen, which produces the fluorescence when being exposed to radiation, may be located on the side outward from the first electrical conductor layer 11 of the radiation image detector 10, the first electrical conductor layer 11 may be permeable to the fluorescence produced by the fluorescent material screen, and the recording photo-conductive layer 12 may exhibit the electrical conductivity when being exposed to the fluorescence.

What is claimed is:

1. A read-out apparatus for an image detector, wherein a reading electromagnetic wave is caused to scan an image detector, on which image information has been recorded as an electrostatic latent image, and electric currents caused by the scanning to flow out of the image detector in accordance with the electrostatic latent image are detected, the read-out apparatus comprising:

i) a surface-shaped wave source constituted of a plurality of small wave sources, which are arrayed in a surface form and each of which produces the reading electromagnetic wave, and ii) wave source control means for performing the scanning by driving said small wave sources one after another.

2. A read-out apparatus as defined in claim 1 wherein the read-out apparatus further comprises electromagnetic shield means located at least on the side of said surface-shaped wave source, which stands facing the image detector.

3. A read-out apparatus as defined in claim 1 wherein said wave source control means is capable of simultaneously driving the plurality of said small wave sources so as to irradiate a pre-exposure electromagnetic wave to the image detector.

4. A read-out apparatus as defined in claim 2 wherein said wave source control means is capable of simultaneously driving the plurality of said small wave sources so as to irradiate a pre-exposure electromagnetic wave to the image detector.

5. A read-out apparatus as defined in claim 1, 2, 3, or 4 wherein the plurality of said small wave sources are point-shaped small wave sources, and said surface-shaped wave source is constituted of the plurality of said point-shaped small wave sources, which are arrayed in a matrix form.

6. A read-out apparatus as defined in claim 1, 2, 3, or 4 wherein the plurality of said small wave sources are line-shaped small wave sources, and said surface-shaped wave source is constituted of the plurality of said line-shaped small wave sources, which are arrayed so as to stand side by side along a direction normal to a longitudinal direction of each small wave source.

7. A read-out apparatus as defined in claim 6 wherein each of said line-shaped small wave sources is constituted of a plurality of point-shaped small wave sources, which are arrayed in a line form.

8. A read-out apparatus as defined in claim 1, 2, 3, or 4 wherein said surface-shaped wave source is constituted of an electroluminescence device.

9. A read-out apparatus as defined in claim 8 wherein said electroluminescence device is an organic electroluminescence device.

10. A read-out apparatus as defined in claim 9 wherein said organic electroluminescence device is provided with a dielectric multi-layer film, which is located on the side facing the image detector.

11. A read-out apparatus as defined in claim 1, 2, 3, or 4 wherein said surface-shaped wave source is constituted of a liquid crystal and a back light source, which is located on a side of said liquid crystal that is opposite to the side of said liquid crystal facing the image detector.

12. A read-out apparatus as defined in claim 1, 2, 3, or 4 wherein the image detector records radiation image information as the electrostatic latent image.

13. An image detecting and read-out apparatus, comprising:

i) an image detector, which records image information as an electrostatic latent image and which generates electric currents in accordance with the electrostatic latent image when it is scanned with a reading electromagnetic wave, ii) current detecting means for detecting the electric currents generated by said image detector, iii) a surface-shaped wave source constituted of a plurality of small wave sources, which are arrayed in a surface form and each of which produces the reading electromagnetic wave, and iv) wave source control means for performing the scanning by driving said small wave sources one after another, said image detector, said current detecting means, said surface-shaped wave source, and said wave source control means being combined with one another.

14. An image detecting and read-out apparatus as defined in claim 13 wherein said image detector records radiation image information as the electrostatic latent image.

* * * * *